United States Patent
Nelson et al.

(10) Patent No.: US 11,117,314 B2
(45) Date of Patent: Sep. 14, 2021

(54) METHOD AND APPARATUS FOR 3D-PRINTING GELS

(71) Applicant: 3M INNOVATIVE PROPERTIES COMPANY, St. Paul, MN (US)

(72) Inventors: Per Miles Nelson, Woodbury, MN (US); Jeffrey N. Bartow, Saint Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 16/769,789

(22) PCT Filed: Dec. 6, 2018

(86) PCT No.: PCT/IB2018/059718
§ 371 (c)(1),
(2) Date: Jun. 4, 2020

(87) PCT Pub. No.: WO2019/111204
PCT Pub. Date: Jun. 13, 2019

(65) Prior Publication Data
US 2021/0162653 A1    Jun. 3, 2021

Related U.S. Application Data (60) Provisional application No. 62/596,503, filed on Dec. 8, 2017.

(51) Int. Cl.
*B29C 64/124*   (2017.01)
*B29C 64/364*   (2017.01)
(Continued)

(52) U.S. Cl.
CPC .......... *B29C 64/124* (2017.08); *B29C 64/232* (2017.08); *B29C 64/245* (2017.08);
(Continued)

(58) Field of Classification Search
CPC .......................... B29C 64/364; B29C 64/371
See application file for complete search history.

(56) References Cited

U.S. PATENT DOCUMENTS

| | | | |
|---|---|---|---|
| 5,545,367 A | 8/1996 | Bae | |
| 2004/0118309 A1* | 6/2004 | Fedor | B29C 64/165 101/480 |

(Continued)

FOREIGN PATENT DOCUMENTS

| | | |
|---|---|---|
| CN | 106945286 A | 7/2017 |
| EP | 0686480 | 12/1995 |
| WO | WO 2017-127561 | 7/2017 |

OTHER PUBLICATIONS

International Search Report for PCT International Application No. PCT/IB2018/059718, dated Apr. 25, 2019, 5 pages.
(Continued)

*Primary Examiner* — Timothy Kennedy
(74) *Attorney, Agent, or Firm* — Thomas M. Spielbauer (57) ABSTRACT

Methods and apparatuses (400) suitable for use in 3D-printing of gels from a solution (470) comprising a polymerizable material dispersed in a solvent are described. Such methods and apparatuses (100) include features (493) to control the relative saturation of the solvent in a gas phase region around the gel during the 3D-printing process.

20 Claims, 7 Drawing Sheets

(51) Int. Cl.
    *B29C 64/232*    (2017.01)
    *B29C 64/245*    (2017.01)
    *B33Y 30/00*     (2015.01)
    *B33Y 10/00*     (2015.01)

(52) U.S. Cl.
    CPC ............ *B29C 64/364* (2017.08); *B33Y 10/00* (2014.12); *B33Y 30/00* (2014.12)

(56) References Cited

U.S. PATENT DOCUMENTS

| | | | |
|---|---|---|---|
| 2015/0277146 A1* | 10/2015 | Crespo Vazquez ... | B29C 64/135 264/1.36 |
| 2016/0214175 A1* | 7/2016 | Nordstrom ............ | B29C 64/364 |
| 2017/0106595 A1* | 4/2017 | Gunther ................ | B29C 64/165 |
| 2018/0200948 A1* | 7/2018 | Kuijpers ............... | B29C 64/364 |

OTHER PUBLICATIONS

International Preliminary Report on Patentability for PCT International Application No. PCT/IB2018/059718, dated Dec. 9, 2019, 11 pages.

* cited by examiner

METHOD AND APPARATUS FOR 3D-PRINTING GELS

CROSS REFERENCE TO RELATED APPLICATIONS

This application is a national stage filing under 35 U.S.C. 371 of PCT/IB2018/059718, filed Dec. 6, 2018, which claims the benefit of Provisional Application No. 62/596,503, filed Dec. 8, 2017, the disclosure of which is incorporated by reference in their entirety herein.

FIELD

The present disclosure relates to methods and apparatuses suitable for use in 3D-printing of gels. Such methods and apparatuses include features to control the relative saturation and reduce the evaporation rate of the solvent of the gel.

SUMMARY

Briefly, in one aspect, the present disclosure provides methods of forming a three-dimensional object from a solution comprising a polymerizable material dispersed in a solvent. These methods include controlling the gas phase region by increasing the relative saturation of the solvent in the gas phase region to at least 60%, e.g., at least 75%. In some embodiments, the solvent comprises water.

In some embodiments, increasing the relative saturation of the solvent in the gas phase region comprises one or more of (a) increasing the vapor pressure of the solvent in the gas phase region; (b) reducing the temperature of the gas phase region; and (c) increasing the pressure of the gas phase region.

In another aspect, the present disclosure provides a method of forming a three-dimensional object from a solution comprising a polymerizable material dispersed in a solvent wherein, the relative saturation of the solvent in the gas phase region is at least 60%.

In another aspect, the present disclosure provides an inverse stereolithographic apparatus comprising a base, a light source, a light controller, a vat adapted to contain a solution comprising a solvent, a build platform located above the vat, a build region located between the build platform and the vat, and an enclosure surrounding the build region; wherein the apparatus further comprises a conditioning unit operable connected to the enclosure to control the relative saturation of the solvent in the enclosure to at least 60%.

In some embodiments, the apparatus further comprising a gas source in fluid communication with the conditioning unit and a conduit for the gas operably connecting the conditioning unit to the enclosure. In some embodiments, the conditioning unit comprises a volume of the solvent, wherein the gas is bubbled through the solvent. In some embodiments, the conditioning unit comprises a nozzle adapted to spray solvent into the gas as it passes through the conditioning unit. In some embodiments, the conditioning unit decreases the temperature of the gas by at least 10° C. In some embodiments, the conditioning unit increases the pressure in the enclosure by at 10% relative to the ambient pressure.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

In many additive or three-dimensional ("3D") fabrication processes, the 3D object is formed in either a step-wise or a continuous manner. In either case, individual layers are formed by irradiating and curing a photocurable resin. Various techniques may be used to control the regions within a layer that are irradiated and cured resulting in a wide variety of complex shapes and structures.

In the traditional vat polymerization technique, objects are created in a "top down" process. In top-down processes, each new layer is formed on top of the previously cured layer. As the object is built, it is gradually lowered into a solution of the uncured resin. Thus, in the top-down process, the object is surrounded by the solution throughout the build process.

In the inverse vat polymerization technique, objects are created in a "bottom up" process. In bottom-up processes, each new layer is formed at the bottom of the previously cured layer. As the object is built, it is gradually raised out of the solution of the uncured resin. While some layers of the object may remain submerged in the pool as subsequent layers are formed, at some point during the build at least a portion of the object may be moved out of the solution into the ambient environment.

Typically, the solutions used for 3D fabrication processes have consisted of the photocurable resin and optionally, non-volatile additives such as fillers. In such applications, the intent is to retain the cured resin and fillers in the completed object. However, the range of materials being 3D-fabricated has expanded and now includes systems with volatile components, including components intended to be removed from the object following the 3D-build process. For example, WO 2017/127561 A1 ("Additive Process of Fluoropolymers") describes 3D printable compositions for making shaped fluoropolymer articles. Such compositions may include a fluoropolymer dispersed in a polymerizable binder material. The compositions may also include solvents (e.g., water). Such solvents may be added to improve the dispersion of the fluoropolymer in the polymerizable binder or may be included as part of an initial dispersion of the fluoropolymer as added to the binder, for example, an aqueous dispersion of the fluoropolymer.

When fabricating 3D objects from solvent-containing dispersions, the cured structure is initially a gel (i.e., a solid, three-dimensional network of the cured resin with an entrapped liquid phase). In many applications, subsequent processing steps (e.g., drying) may be used to remove the solvent, transforming the gel to an essentially solvent-free solid. Further processing steps may be done to remove the binder, and optionally sinter the remaining material. For example, as described in WO 2017/127561 A1, the binder may be burned off and the remaining fluoropolymer particles may be sintered to form the finished product.

When creating gels using a bottom-up 3D build process, the present inventors discovered significant distortion in the structures including severe bowing or curvature of walls. As is known, gels may range from soft to rigid structures. However, upon investigation, the present inventors determined that the distortions were not merely the result of any deficiencies in the mechanical properties of the gel itself. In addition, they discovered that this problem was often more significant when the structure included both external and internal surfaces. Surprisingly, the present inventors discovered they could reduce the distortion of the gels by controlling the ambient environment around the exposed gel. In particular, they discovered that, by controlling the ambient environment to reduce evaporation of the solvents, they could reduce distortion.

As described above, in a top-down process the gel structure would be continuously submerged in the solution and any removal of the solvent would be delayed until the building process was completed. However, in a bottom-up process, at some point in the build the gel will be raised out of the solution and into the ambient environment. Depending on the size of the object, the build process can take several hours or more, providing substantial time during which solvents from the exposed gel may evaporate. Without wishing to be bound by any theory, it is believed that differential solvent removal rates from various parts of the object during the build process can induce differential stresses resulting in the observed distortion of the object.

Although the following additional details refer to specific materials, apparatuses, and processes, one of ordinary skill in the art will readily recognize that the present disclosure is equally applicable to any materials, apparatuses, and processes where a volatile-solvent-containing object (e.g., a gel) is formed in an additive manufacturing process and where the object is exposed to ambient conditions for an extended time during the build process (e.g., a bottom-down process).

Generally, any suitable additive manufacturing process may be used. For purposes of illustration, a step-wise, stereolithographic process will be described. However, other techniques, including continuous processes, such as continuous liquid interphase printing (CLIP), may be used. In addition, as the details and possible variations of additive manufacturing apparatuses and processes are well-known, only certain, non-limiting, features of such apparatuses are provided.

Figure 1:
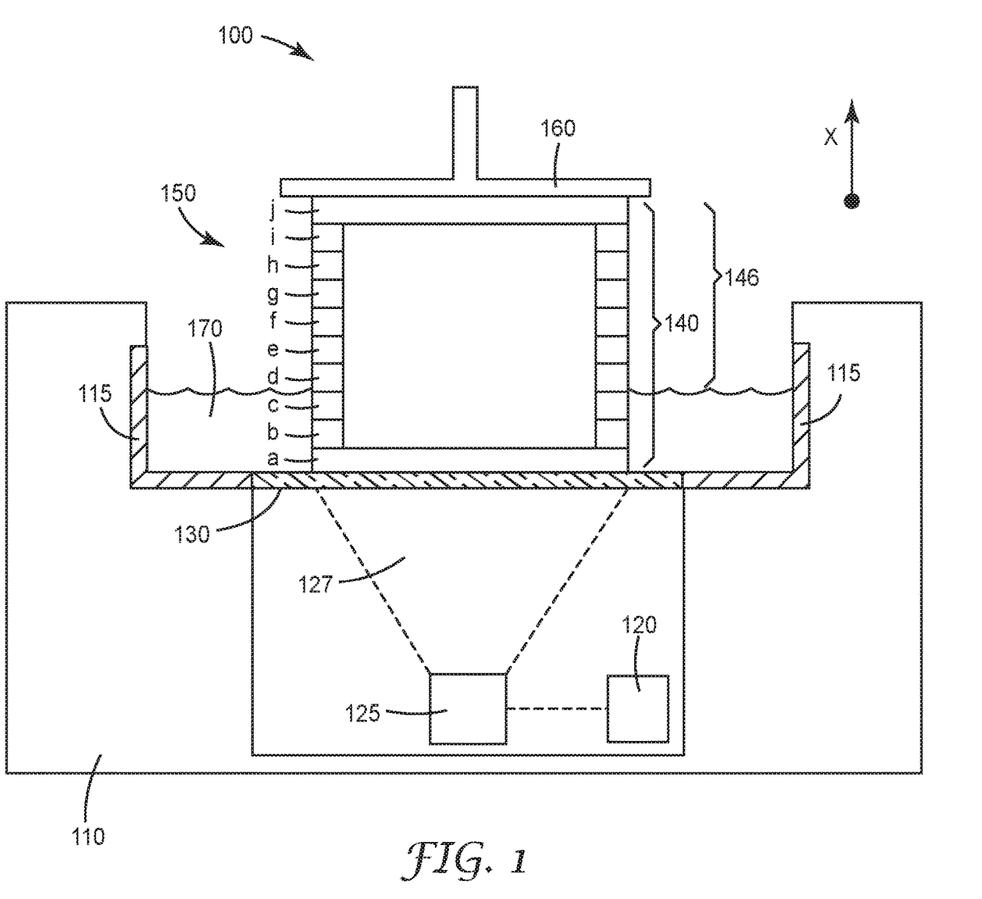
FIG. 1 is a diagram of a stereolithography apparatus (SLA).

A diagram of an inverse stereolithographic apparatus (SLA) 100 is shown in FIG. 1. Apparatus 100 includes base 110, which contains light source 120, light controller 125, and vat 115 containing solution 170. Generally, the composition of solution 170 is not particularly limited provided it contains a curable resin and a solvent (e.g., water). Generally, any known light source may be used, e.g., lasers and light emitting diodes (LEDs). The wavelength of light may be selected to match the photocuring parameters of the curable resin, including, for example, visible and ultraviolet wavelengths.

Light 127 is directed through window 130 into layer "a" of solution 170. Initially, the photocurable resin in layer "a" is uncured. The light controller responds to data defining the features of an individual layer of the 3D object and directs light to only those regions of layer "a" where the photocurable resin in solution 170 is to be cured. Upon exposure to light 127, the resin in layer "a" is photocured in the desired regions, entrapping some solvent and forming a gel. Layers "b" though "j" have already been built according to this process and comprise a gel formed of the cured resin and solvent.

During the build process, build platform (also referred to as a build plate) 160 is translated away from solution 170 in the direction indicated by arrow X. In step-wise methods, the build platform in incrementally translated following each exposure step. In continuous methods, the build platform may be translated continuously during the build process. In some applications, the position of the build platform is cycled away from and back toward the solution to aide in providing a layer of uncured resin between the lower surface of the previously built layer and the surface of window 130.

In many applications, the build process includes the creation of hundreds or even thousands of layers. For illustration purposes, object 140 is shown as having only ten layers, which are identified as layers "a" to "j". Layer "j" was the first layer formed and is adhered to build platform 160. In some embodiments, layer "j" is directly bonded to the platform. In some embodiments, additional substances may be interposed between layer "j" and the build platform. For example, in some embodiments, a release layer or sacrificial layer may be used to simplify removal of the finished object from the build platform while minimizing damage.

As object 140 was built, each layer was formed adjacent to window 130. Thus, layers "d" through "j" were initially submersed in solution 170. During the build process, as build platform 160 was translated away from base 110, layers "d" though "j" were moved out of solution 170 into ambient environment 150. Collectively, layers "d" through "j" form exposed portion 146 of object 140. Cured gel layers "b" and "c" are shown still submerged in solution 170, but would be moved into ambient environment 150 becoming part of exposed portion 146 upon successive translations of the build platform.

Figure 2:
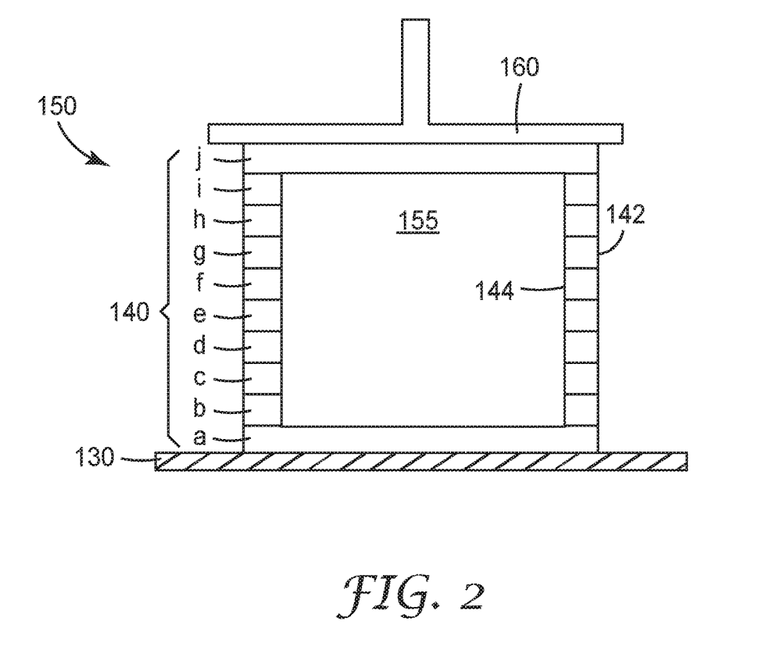
FIG. 2 illustrates the desired shape of an exemplary object made as a gel using a 3D additive manufacturing process.

The desired shape of object 140 is shown in FIG. 2. Again, for purposes of illustration, only ten layers are shown and the layer thicknesses are not to scale. Object 140 is a simple box with open ends. The box is defined by a top wall formed by layer "j" adjacent build platform 160 and a bottom wall formed by layer "a" adjacent window 130. The top and bottom walls are connected by perpendicular side walls formed by layers "b" to "i" enclosing inner volume 155. Exterior surfaces 142 of layers "a" through "j" are directly exposed to ambient environment 150. Interior surface 144 of layers "a" through "j" are at least partially shielded from the ambient environment by various portions of object 140. These interior surfaces are exposed to interior environment 155.

In some embodiments, more complex objects may be formed where certain surfaces are more significantly shielded from the ambient environment, e.g., objects having enclosed or nearly enclosed regions such as tunnels, pores, channels, and chambers. Generally, the more a surface is shielded or enclosed, the more the interior environment to which it is exposed will differ from the external, ambient environment. For example, the temperature and vapor pressure of solvent evaporating from the gel may be higher within an enclosed region. Also, flow rates of air may be higher across external surfaces than across shielded or internal walls.

Figure 3:
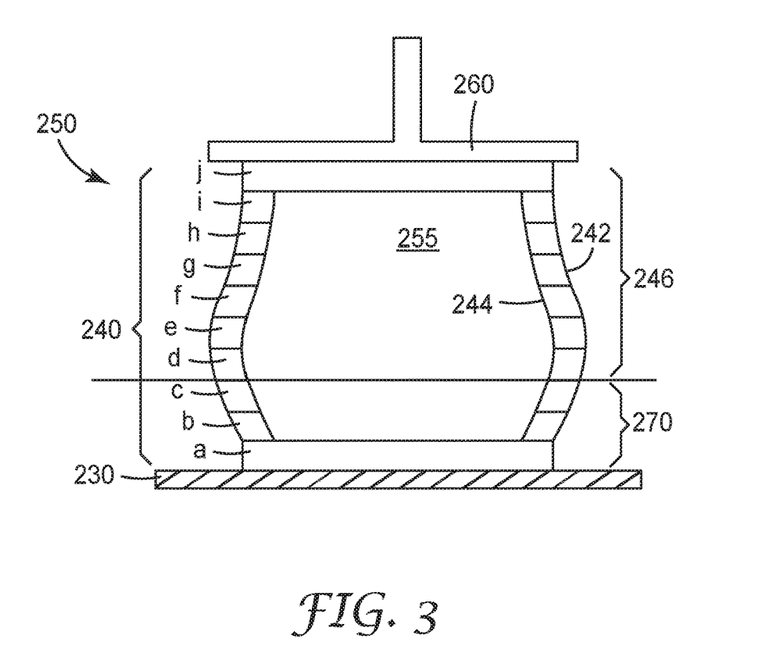
FIG. 3 illustrates the distortion of the exemplary object of FIG. 2 while it is being built using a conventional 3D additive manufacturing process.

Object 240, shown in FIG. 3, corresponds to object 140 and uses similar numerals and letters to indicate corresponding parts. FIG. 3 illustrates what the present inventors observed when building various 3D objects having both interior and exterior surfaces.

Object 240 is being built from solution 270. Built layers "b" to "j" comprise a gel of cured resin and entrapped solvent. Layer "a" is adjacent window 230 where it will be exposed to light and cured. Layer "j" is attached to build platform 260. As platform 260 was translated away from solution 270, layers "d" to "j" were moved out of the solution forming exposed portion 246. Exterior surfaces 242 of the layers forming exposed portion 246 are exposed to ambient environment 250, while interior surfaces 244 of these same layers are exposed to interior environment 255.

As shown, the walls formed by layers "d" to "i" are bowed outward. Upon observing such behavior, one might conclude that, being made of a gel, the walls lack sufficient mechanical integrity to remain perpendicular during the build process. However, the present inventors discovered this was not the case. Rather, they discovered that this distortion could be reduced by controlling the ambient environment around the object during the build process. In particular, they discovered that, by controlling the ambient environment to reduce evaporation from the gel, the distortion could be reduced or eliminated.

The rate of evaporation of a solvent from the surface of a gel can be reduced by increasing the relative saturation (RS) of the solvent in the gas phase region surrounding the gel. The relative saturation of a solvent is defined as the ratio of the partial pressure of the solvent (Px) over the saturation pressure of the solvent (Px,s) multiplied by 100%. The saturation pressure of a solvent is a function of temperature (T) and the partial pressure is a function of the total pressure P; thus, $$RS = \left[\frac{Px(P)}{Px, s(T)}\right] \times 100\%.$$

When the solvent is water, the relative saturation is typically referred to as the relative humidity.

The relative saturation can be increased by increasing the vapor pressure of the solvent. However, in some embodiments, the relative saturation can be increased by decreasing the temperature, which decreases the saturation pressure of the solvent. In some embodiments, increasing the total pressure can also increase the relative saturation of the solvent. Each of these techniques may be used alone or in any combination.

In some embodiments, it is only necessary to control the environment in the immediate vicinity of the object relative to the ambient environment, i.e., the environment that would exist absent the control features. To facilitate these methods, in some embodiments, a chamber may be used to form an enclosed volume around the object as it is built. In this way, it may be easier and more economical to control the environment of the enclosed volume. For illustrative purposes, the following discussion refers to controlling the environment in an enclosed volume.

Figure 4:
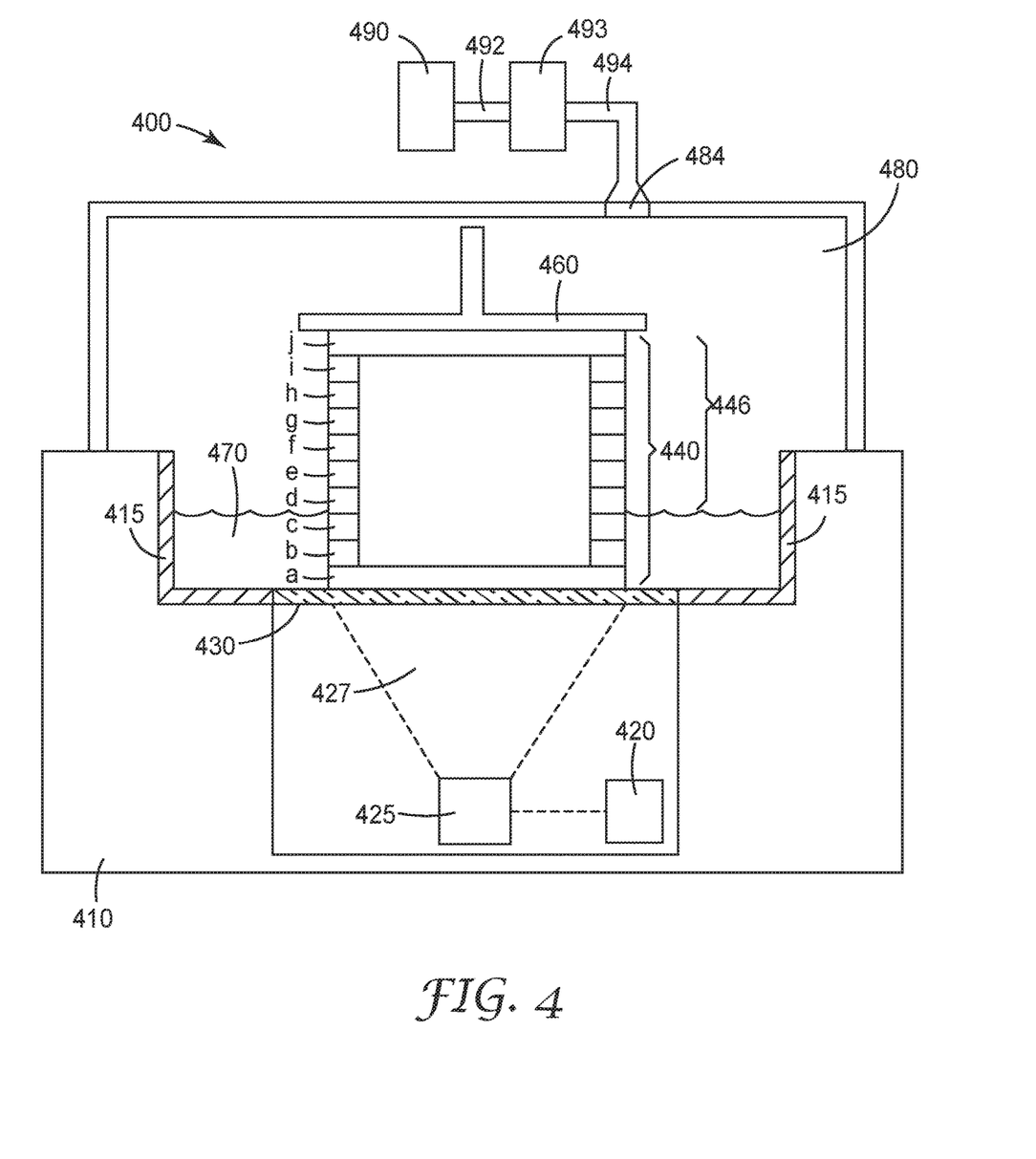
FIG. 4 is schematic diagram of an SLA including an enclosure according to some embodiments of the present disclosure.

Referring to FIG. 4, exemplary apparatus 400 includes base 410, which contains light source 420 and light controller 425 for controlling light 427 passing through window 430. Base 410 also includes vat 415 containing solution 470. Generally, the composition of solution comprises a curable resin and a solvent (e.g., water). Object 440 comprises a gel of the cured resin and the solvent. During the build process, build platform 460 is moved away from the solution in vat 415 as object 440 is created. Throughout the build process, object 440, particularly exposed portion 446, is enclosed within enclosure 480.

Although shown as a rectangular box, the size and shape of the enclosure are not critical. However, in some embodiments, it can be desirable to create as small of an enclosure as possible without interfering the build process. As shown in FIG. 4, port 484 is used to control the ingress of conditioned air into enclosure 480, while the egress of air is facilitated by gaps between adjacent walls of the enclosure or where the enclosure 480 meets base 410. In some embodiments, it may be desirable to seal the enclosure, limiting both the ingress and egress of air and other gases to defined locations, e.g., ports. In some embodiments, multiple inlet or outlet ports may be used.

In some embodiments, gas supply 490, e.g., a house air supply or a pressurized tank of gas (e.g., air, nitrogen, carbon dioxide, or other gases or mixtures of gases) is connected by first conduit 492 (e.g., a hose or pipe) to optional conditioning unit 493. In some embodiments, the gas supplied may not have the desired properties, e.g., temperature, pressure, and/or concentrations. In such embodiments, the properties of the gas may be modified in the conditioning unit. For example, in some embodiments the temperature of the gas can be adjusted, the pressure of the gas can be adjusted, the concentration of components in the gas can be adjusted, or any combination thereof. The conditioned gas is then routed to port 484 through second conduit 494. In some embodiments, the properties of the gas as-supplied may be sufficient, and no conditioning unit is required. In such embodiments, the gas may be routed directly from gas supply 490 to enclosure 480, e.g., through a conduit connected to port 484. In either case, the gas enters enclosure 480, modifying the environment in the vicinity of object 440.

Generally, the nature of the conditioning unit is not critical. For example, to adjust (e.g., lower) the temperature of the gas, in some embodiments, the conditioning unit may include a heat exchanger, e.g., a co-flowing or counterflowing heat exchanger. In some embodiments, the gas may flow through a conduit, e.g., a metal tube, submersed in a chilled solution such as water or in some embodiments ice. Generally, one of ordinary skill in the art can select an appropriate conditioning unit to adjust and control the temperature of a gas stream, and many such units are commercially available.

As another example, to adjust (e.g., increase) the pressure of the gas, a compressor may be used. Generally, one of ordinary skill in the art can select an appropriate conditioning unit to adjust and control the pressure of a gas stream, and many such units are commercially available.

As another example, to adjust the vapor pressure of select components (e.g., to increase the vapor pressure of water), the desired vapor may be injected into or mixed with the gas stream. For example, the conditioning unit may include a vessel filled with the liquid solvent (e.g., water). The gas may then be bubbled through or otherwise mixed with the liquid solvent resulting in an increase of the vapor pressure of the solvent in the gas. In other embodiments, the conditioning unit may include a vessel into which the gas is delivered. Solvent may then be introduced as a vapor or a mist (i.e., droplets) and mix with the gas. In such embodiments, gas with an increased concentration of the solvent (e.g., saturated with the solvent) may then be extracted from the vessel through known means and delivered to the enclosure.

In some embodiments, the environment within the enclosure may be monitored using known means such as thermometers, thermocouples, pressure sensors, humidity sensors, and the like as well as combinations thereof. The monitored parameters may be used to adjust the conditioning or flow rate of the gas to achieve the desired environment within the enclosure. Such adjustments could be made manually or as part of an automated feedback control loop. Details of such systems are well-known and commercially available.

In some embodiments, the relative saturation of the solvent in the gas phase region surrounding the gel during the build process should be at least 60%. In some embodiments, the relative saturation is at least 65%, at least 70% or even at least 75%. In some embodiments, the relative saturation may be as high as 100%. However, at very high relative saturations there is some risk that the solvent may condense. In some embodiments, this may have an undesirable effect, e.g., it may alter the relative concentration of the printable composition in the vat. In some embodiments, the relative saturation is no greater than 95%, e.g., no greater than 90% or even no greater than 85%. In some embodiments, the relative saturation is controlled to with the range of 60% to 95%, e.g., 65 to 95%, 70 to 95%, 75 to 95%, 75 to 90% or even 75 to 85%, wherein all ranges include the end points.

EXAMPLES

A 3D-printable composition containing a polytetrafluoroethylene (PTFE) dispersion was prepared as follows. First, 800.02 grams of a modified PTFE dispersion was weighed into a first bottle followed by agitation by a lab bottle roller. Water (200 g), a first acrylic monomer (70 g of SR 415 from Sartomer) and a second acrylic monomer (70 g of SR 344 from Sartomer) were weighed into a second bottle and mixed. Subsequently, 2.88 g of a photointiator (OMNIRAD TPO-L), 1.15 g of an inhibitor (BHT from Sigma Aldrich), and 0.58 g of an optical brightener (MAYZO OB-M1) were added to the second bottle and the contents were agitated on a lab bottle roller to form the binder mixture. Upon complete mixing, the binder mixture was slowly added to the dispersion and the resulting 3D-printable composition was further agitated on a lab bottle roller for the entire time before use (a minimum of thirty minutes).

Figure 5:
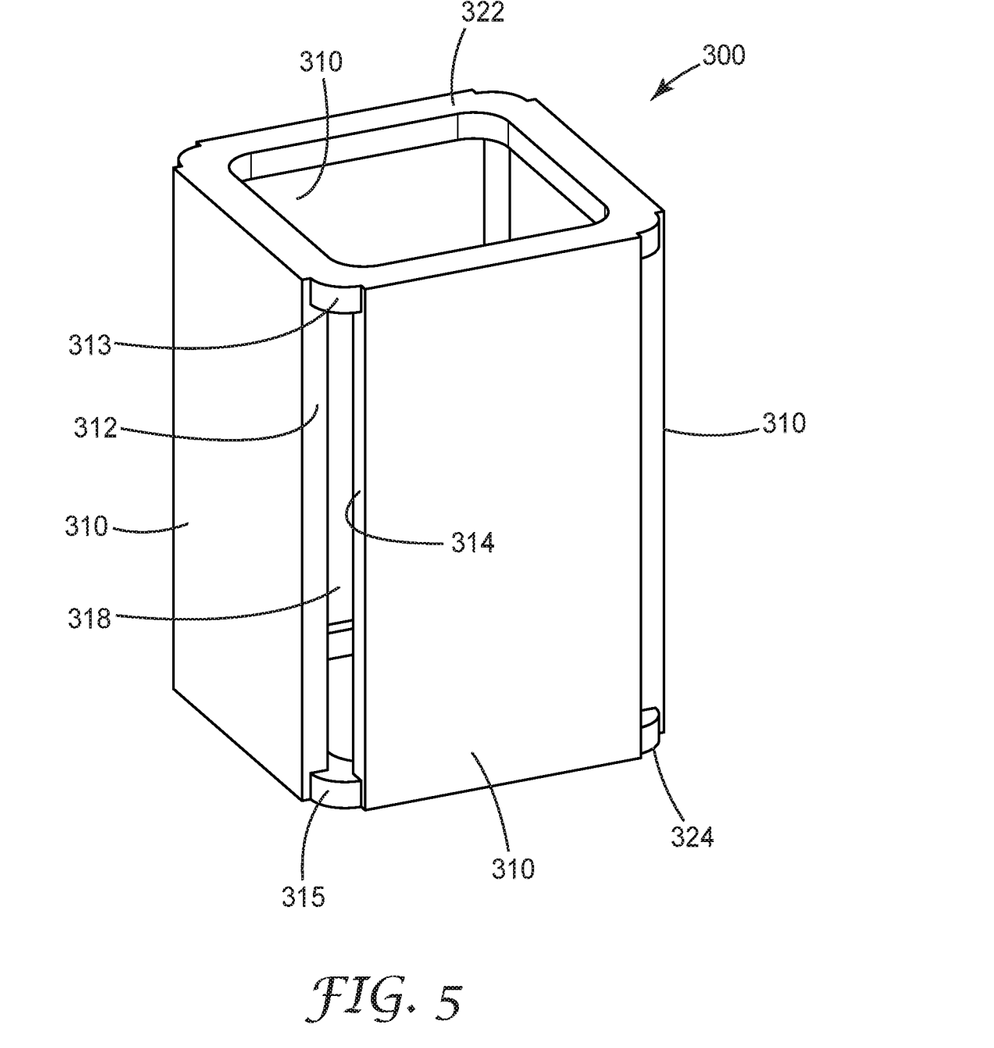
FIG. 5 illustrates the object to be built in the examples of the present disclosure.

A solid model (CAD file) was produced of a hollow, substantially rectangular column 300, as shown in FIG. 5. Column 300 is formed of four sheet-like walls 310, and has an open top 322 and bottom 324. Each wall was 1.5 mm thick, 18 mm wide, and 30 mm tall. The edges of adjacent walls (e.g., 312 and 314) were only connected by small rounded connections at the top and bottom corners (313 and 315) leaving gap (318) along most of the length of the walls.

The CAD file was loaded into ASIGA COMPOSER build composing software, and build command containing two duplicates columns placed side-by-side was generated as eight hundred and sixty-six layers without supports. Each column was oriented as shown in FIG. 5. The additional printing parameters summarized in Table 1 were added to compete the printing command. The complete printing command was transferred to an ASIGA PICO 2 HD SLA-type 3D-printer.

TABLE 1

Summary of additional printing parameters.

| Parameter | Units | Value |
| --- | --- | --- |
| Scale | % | 147 |
| Exposure time | seconds | 2 |
| Burn in time | seconds | 10 |
| Burn in layers | count | 2 |
| Slider | On/Off | On |
| Slides per layer | count | 1 |
| Slide velocity | millimeters/second | 10 |
| Smart slide lag | millimeters | 0.2 |
| Separation Velocity | millimeters/second | 1 |
| Separation Distance | millimeters | 5 |
| Approach velocity | millimeters/second | 4.95 |
| Base layer type | — | Full Sheet |
| Base layer thickness | millimeters | 0.2 |
| All wait times | seconds | 0 |
| Print duration | hours:minutes | 3:09 |

The same batch of printable solution was used for both the Example and the Comparative Example. The solution was poured into a clean vat and the printer was equipped with a standard ASIGA build plate (manually-roughened, aluminum). The printer includes a build chamber forming an enclosure around the object during the build process. An electronic, battery operated temperature and humidity sensor obtained from lab supply was secured in the build chamber of the printer to measure the humidity within this enclosure.

Comparative Example. No steps were taken to control the environment in the enclosure during the build process of the Comparative Example. The humidity in the enclosure was about 24% relative humidity during the duration of the build.

Example. During the build process of the Example, humidified air was supplied to the enclosure as follow. Compressed air was generated and supplied via polymeric tubing through first and second flasks containing water. The compressed air outlets in both flasks were porous air diffusers submerged in water in each flask (causing the airflow to divide into a multitude of air bubbles). To further increase the relative saturation (humidity), the second water flask was placed on a hotplate set to 90° C. The resulting humidified air passed through a standard glass 'vacuum trap' to reduce atomized water before being directed by tubing into the enclosure at a rate sufficient to raise the humidity of the build chamber to between 79 and 86% relative humidity for the duration of the build.

Figure 6A:
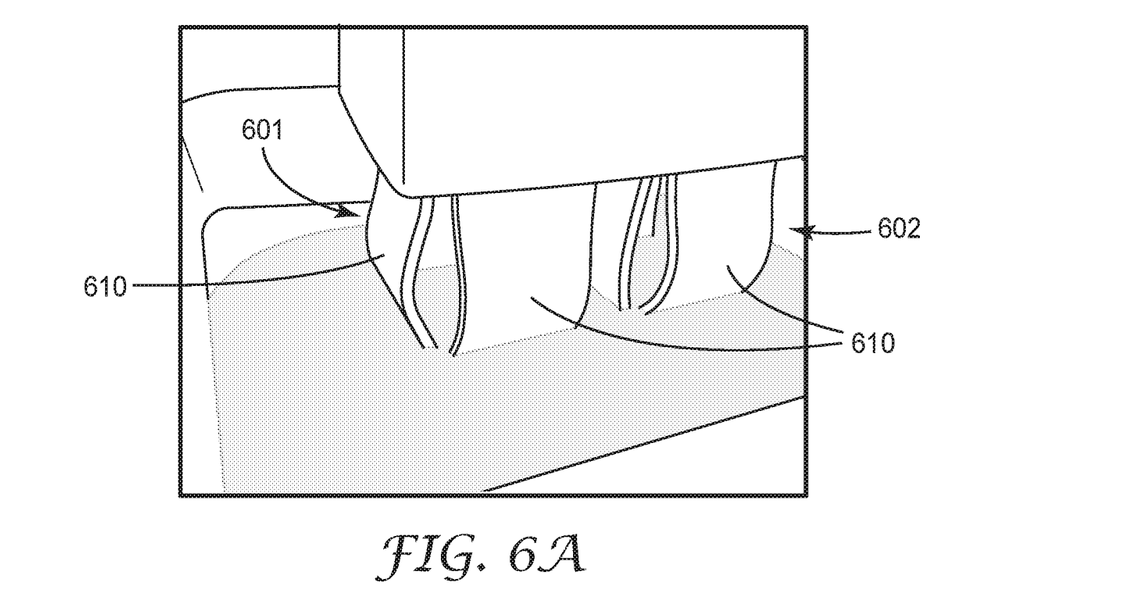
FIGS. 6A and 6B illustrate the object as it was built in the Comparative Example.
Figure 6B:
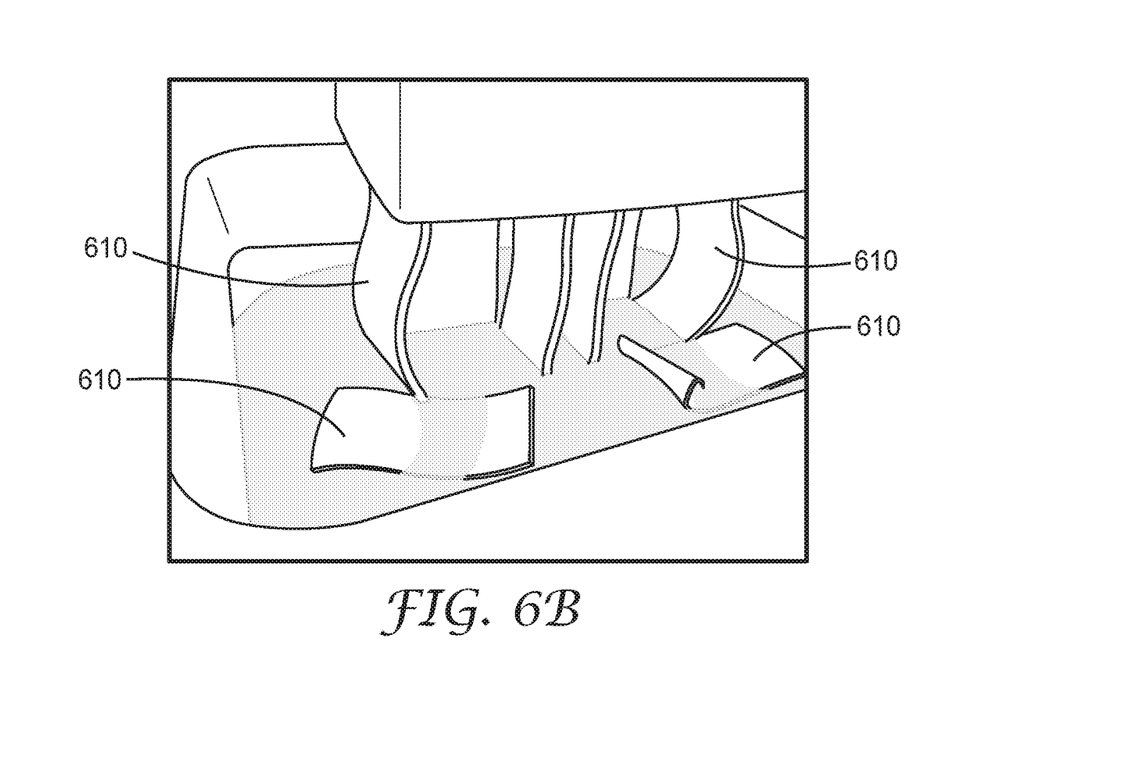

Results. Photographs of the object (rectangular columns) were taken during the printing of the six hundred and sixty-eighth (668th) and eight hundred and forty-seventh (847th) layers of the Comparative Example. The images were traced and are shown in FIGS. 6A and 6B, respectively. Walls 610 of both columns 601 and 602 are bowed significantly outward, and the gaps between adjacent walls are distorted. This bowing/distortion was so great that several walls broke free from the build platform, and the build was stopped at the 847th layer.

Figure 7A:
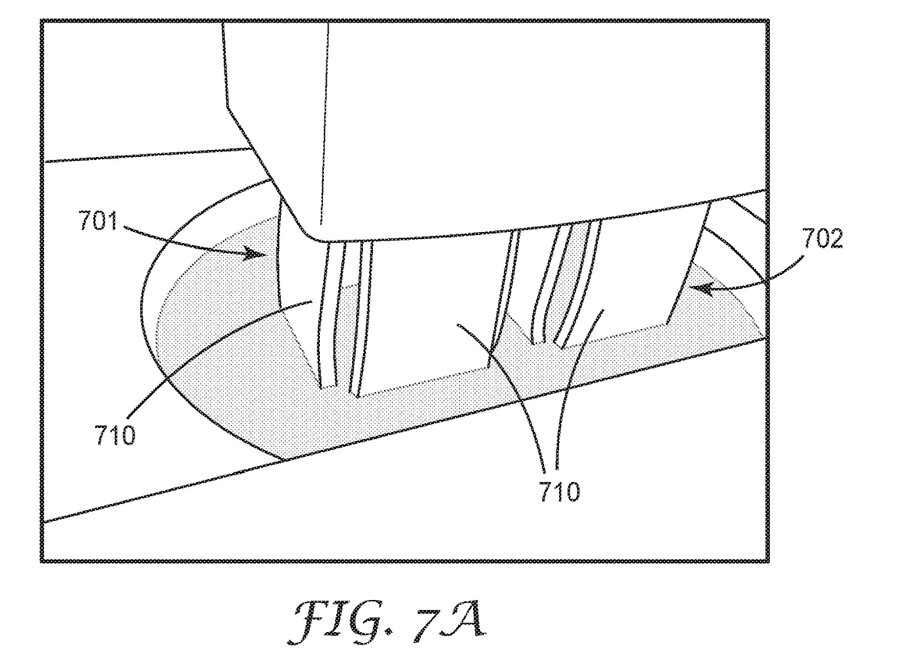
FIGS. 7A, 7B and 7C illustrate the object as it was built in the Example.
Figure 7B:
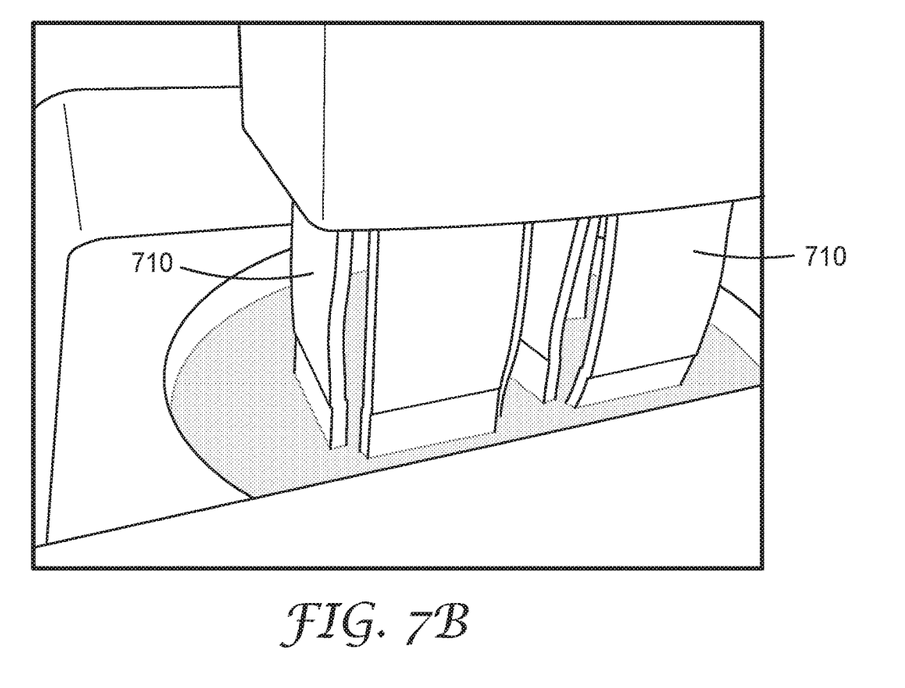
Figure 7C:
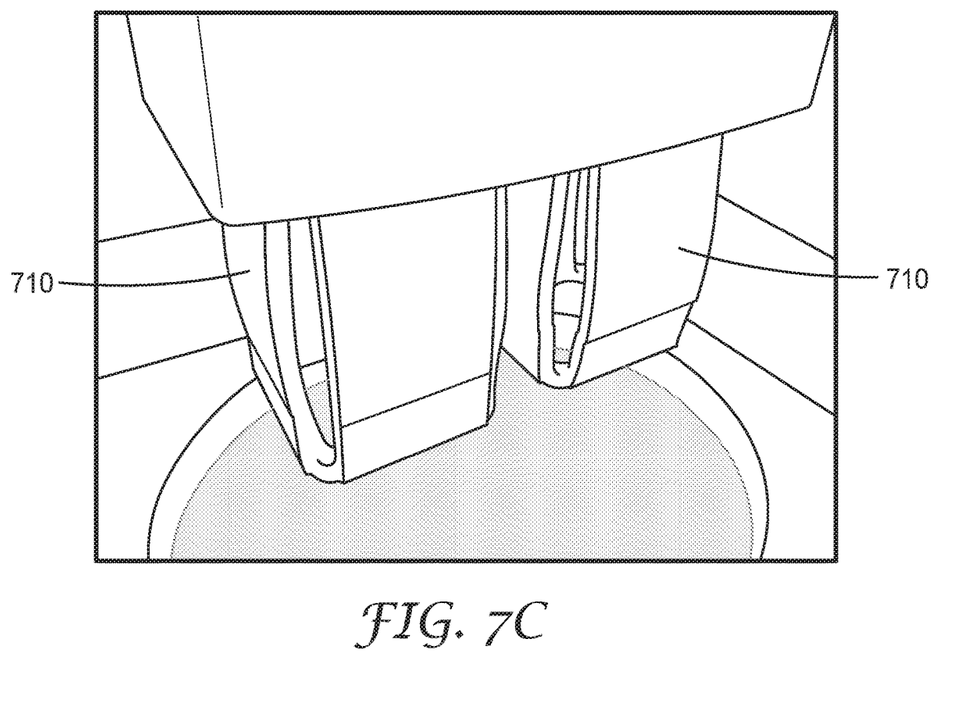

Photographs of the object (rectangular columns) were taken during the printing of the six hundred and seventy-fourth (674th) and eight hundred and fifty-first (851st) layers of the Example, and after the complete build. The images were traced and are shown in FIGS. 7A, 7B and 7C, respectively. Although walls 710 still show a slight curvature away from the center of each column 701 and 702, the distortion is substantially reduced. Also, all the walls remained attached to the build platform throughout and after the build process.

Various modifications and alterations of this invention will become apparent to those skilled in the art without departing from the scope and spirit of this invention.

What is claimed is:

1. A method of forming a three-dimensional object from a solution comprising a polymerizable material dispersed in a solvent comprising:
   building the three-dimensional object by repeatedly
   a. irradiating the solution in a build region between a build platform and a window to polymerize the material to form a gel comprising the solvent and the polymerized material; and
   b. translating the build platform to move the gel away from the build zone, wherein, during the building at least a portion of the gel is moved out of the solution and into a gas phase region adjacent the solution; and
   controlling the gas phase region by increasing the relative saturation of the solvent in the gas phase region to at least 60%.

2. The method of claim 1, wherein the solvent is water.

3. The method of claim 1, wherein controlling the gas phase region comprises increasing the relative saturation of the solvent in the gas phase region to at least 75%.

4. The method of claim 1, wherein increasing the relative saturation of the solvent in the gas phase region comprises increasing the vapor pressure of the solvent in the gas phase region.

5. The method of claim 4, wherein increasing the vapor pressure of the solvent comprises introducing solvent into the gas phase region.

6. The method of claim 5, wherein introducing solvent into the gas phase region comprises injecting solvent vapor into the gas phase region.

7. The method of claim 1, wherein increasing the relative saturation of the solvent in the gas phase region comprises reducing the temperature of the gas phase region.

8. The method of claim 7, wherein the temperature of the gas phase region is reduced to at least 10° C. below ambient temperature.

9. The method of claim 1, wherein increasing the relative saturation of the solvent in the gas phase region comprises increasing the pressure of the gas phase region.

10. The method of claim 9, wherein the pressure of the gas phase region is increased by at least 10% relative to ambient pressure.

11. An inverse stereolithographic apparatus comprising a base, a light source, a light controller, a vat adapted to contain a solution comprising a solvent, a build platform located above the vat, a build region located between the build platform and the vat, and an enclosure surrounding the build region; wherein the apparatus further comprises a conditioning unit operably connected to the enclosure to control the relative saturation of the solvent in the enclosure to at least 60%.

12. The apparatus of claim 11, further comprising a gas supply in fluid communication with the conditioning unit and a conduit for the gas operably connecting the conditioning unit to the enclosure.

13. The apparatus of claim 12, wherein the conditioning unit increases the vapor pressure of the solvent in the gas such that the relative saturation of the solvent is at least 65%.

14. The apparatus according to claim 12, wherein the conditioning unit comprises a volume of the solvent, wherein the gas is bubbled through the solvent.

15. The apparatus of claim 12, wherein the conditioning unit comprises a nozzle adapted to spray solvent into the gas as it passes through the conditioning unit.

16. The apparatus according to claim 14, wherein the solvent is water.

17. The apparatus of claim 11, wherein the conditioning unit comprises a heat exchanger to decrease the temperature of the gas by at least 10° C.

18. The apparatus of claim 11, wherein the conditioning unit comprises a compressor to increase the pressure in the enclosure by at least 10% relative to the ambient pressure.

19. The method of claim 1, wherein the relative saturation of the solvent in the gas phase region is increased to no greater than 90%.

20. The apparatus of claim 11, wherein the conditioning unit is operably connected to the enclosure to control the relative saturation of the solvent in the enclosure to no greater than 90%.

* * * * *